J. R. Morris,
Rotary Plow
No. 113,190. Patented Mar. 28, 1871.
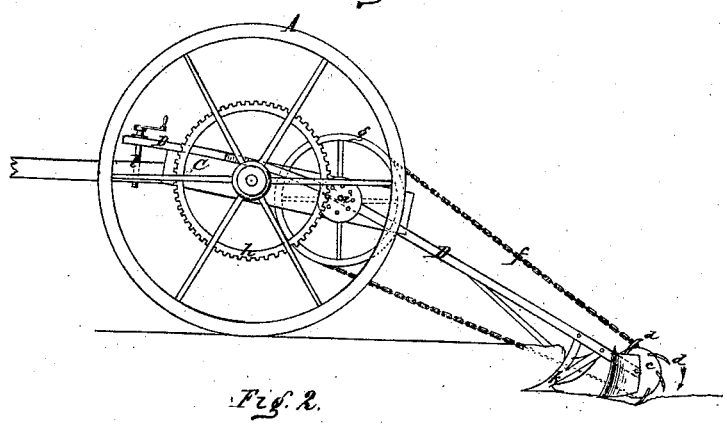
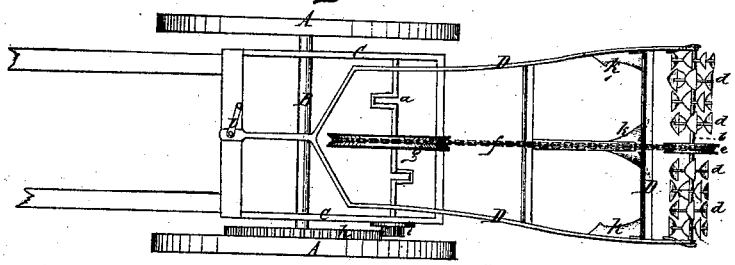
Witnesses:
Inventor:
J. R. Morris.

UNITED STATES PATENT OFFICE.

JOSEPH R. MORRIS, OF HOUSTON, TEXAS.

IMPROVEMENT IN ROTARY SUBSOIL-PLOWS.

Specification forming part of Letters Patent No. 113,190, dated March 28, 1871.

*To all whom it may concern:*

Be it known that I, JOSEPH R. MORRIS, of Houston, in the county of Harris and State of Texas, have invented a new and Improved Subsoil-Plow; and I do hereby declare the following to be a full, clear, and exact description of the same, reference being had to the accompanying drawings, making a part of this specification, in which—

Figure 1 is a side elevation, and Fig. 2 is a top view.

The invention consists in a shaft bearing a sufficient number of spades attached in any suitable manner to its perimeter, which shaft is mounted in a frame supported upon master-wheels, and is also rotated by means of gearing driven by an engine set upon the frame, said shaft and spades being combined with plows located in front thereof and arranged so as to cut furrows for the frame and chain-wheels to sink into, so that the shaft and spades at the rear end of the frame may penetrate beneath the surface of the earth and disintegrate the subsoil, said shaft being connected with the interposed gearing in such manner as to revolve against the line of motion of the frame and master-wheels.

Referring to the drawings, A are the master-wheels; B, their axle; C, a frame mounted on said axle; $a$, a shaft placed transversely to the rear part of the frame C; D, a frame mounted on the shaft $a$, and extending rearward beyond the frame C to any sufficient distance, said frame D having a shaft, $b$, mounted transversely to its rear end, on which shaft is secured a number of disks, $c$, at suitable distances apart, to the edges of which disks are fastened inclined spades $d$. A grooved wheel, $e$, is located centrally on the shaft $b$, which wheel is connected by a chain, $f$, with a grooved wheel, $g$, located centrally to the shaft $a$, said shaft with its wheel, and also the wheel $e$ and the master-wheels, being rotated by means of a steam-engine to be supported on the frame C, the motion imparted to the shaft $b$ being contrary to that of the master-wheels. Plows $k$ are attached to the frame in front of the shaft $b$ in such position as to cut furrows in which the side pieces of said frame and the chain $f$ may run, thus allowing the shaft $b$ and its spades to bury themselves in the earth as deeply as they may be able to run. The frame D is provided at its front end with a screw, $l$, that is stepped in the frame A, and is intended to raise or lower the shaft $b$ by rotating the screw in the proper direction. The result of rotating the spades $d$ in the opposite direction to the line of motion of the machine is to cause them to throw the earth behind them, and thus enable them to be run at a rate of speed which, if they were rotated in the opposite direction, would result in throwing the earth in front of the spades, and consequently could not be attained. Further, the rotation of the spades in this direction causes them to bury themselves in the earth, even below its surface, and from this mode of operation two important advantages result—viz., the disintegration of the subsoil and turning it up to the surface, and also the location of the spades at the least possible distance from the surface of the shaft, and the consequent diminution of the resistance the spades encounter in penetrating the earth. A four-inch shaft provided with four-inch spades will cut to the depth of twelve inches—that is, six inches above the center of the shaft and six inches below it. If the spades were rotated in the same direction as the master-wheels, the shaft could not penetrate beneath the surface of the earth, and the spades, in order to cut the depth of twelve inches, would necessarily be placed twelve inches from the shaft, which would greatly increase their resistance. By the tendency of the spades to bury themselves in the soil, the master-wheels are drawn downward against the earth and their tractile force thereby so much increased as to enable light wheels and frames to answer an equally useful purpose with heavier ones.

Having thus described my invention, what I claim as new, and desire to secure by Letters Patent, is—

1. A series of spades placed at an obtuse angle to the radiuses of disks, arranged parallel to each other and on the same rotary shaft, for the purpose specified.

2. A series of spades arranged upon the same pulleyed and rotary shaft, combined with furrow-opening plows $k$, for the purpose of allowing the said spades to bury themselves in the soil in the manner described.

To the above specification of my invention I have signed my hand this 21st day of February, 1871.

J. R. MORRIS.

Witnesses:
SOLON C. KEMON,
THOS. D. D. OURAND.